Oct. 26, 1965   D. A. REICHERT ETAL   3,214,137
LANDING GEAR FOR SEMI-TRAILERS
Filed Dec. 4, 1963

INVENTOR.
DARWIN A. REICHERT AND
JOSEPH S. NESBITT,
BY
ATTORNEYS

United States Patent Office 3,214,137
Patented Oct. 26, 1965

3,214,137
LANDING GEAR FOR SEMI-TRAILERS
Darwin A. Reichert, 2362 Durbin Drive, and Joseph S. Nesbitt, 1435 Chieftain Circle, both of Fremont, Ohio
Filed Dec. 4, 1963, Ser. No. 328,041
7 Claims. (Cl. 254—86)

This invention relates to semi-trailers which are vehicles having two or more wheels at the rear and adapted to be supported at the front upon a tractor to be towed thereby. More particularly, the invention relates to the so-called landing gear which supports the front end of the semi-trailer when the latter is uncoupled from the tractor. More specifically still, this invention relates to an air lift device by means of which the front end of the semi-trailer may be raised a limited amount when the trailer is supported on its landing gear.

Conventionally the tractor is a diesel or gasoline powered truck having in a substantially horizontal position at its rear a so-called fifth wheel. The trailer is provided with a king pin which engages in the center of the fifth wheel and means are provided to couple the king pin to the fifth wheel so that the semi-trailer may be towed by the tractor and pivot about the king pin as the vehicle goes around a curve.

Conventionally the semi-trailer is provided at the front with a so-called landing gear. The landing gear generally comprises one or two (usually two) struts which incorporate a jack. In other words, there is a fixed strut member and a movable telescoping member which can be extended to ground engaging position or retracted to traveling position. The landing gear is generally extended by means of a manually operated crank operating through bevel gearing and a screw and nut arrangement. Many landing gear struts are provided with two-speed gearing so that the front end of the trailer may be raised to uncouple the trailer from the tractor, but even with two-speed gearing this is a difficult job.

The fifth wheel height above the ground of different tractors varies considerably, and while it is a simple job to couple a trailer with a tractor having a lower fifth wheel, it is very difficult to couple a trailer with a tractor having a higher fifth wheel, because this involves raising the front end of the trailer.

Furthermore, difficulty is encountered when trailers are dropped with the landing gear on soft ground or when the landing gear is resting on snow or ice which later thaws permitting the trailer to sink down to a point where the tractor cannot maneuver into position for coupling, and generally a wrecker with the crane is used to lift the trailer up so the tractor can back under it.

Many truckers will put 4 x 4 lumber under the landing gear to prevent the sinking problem outlined above, but with a heavily loaded trailer, such lumber can break so that the trailer will either sink or tilt.

All of the foregoing problems cause great loss of time and thus of money.

With the foregoing considerations in mind, it is a principal object of the present invention to provide means whereby when the trailer landing gear has been extended into contact with the ground, the trailer can be lifted by fluid pressure by an amount sufficient to raise the front end of the trailer off the fifth wheel or to permit a tractor fifth wheel to get under the king pin. Other objects of the invention include the provision of means as outlined above which will be simple and relatively fool-proof and easy to operate.

These and other objects of the invention which will be disclosed in greater detail hereinafter will be described in connection with the drawing forming a part hereof, and in which FIGURE 1 is a fragmentary view of a tractor and semi-trailer in traveling position.

Figure 1:
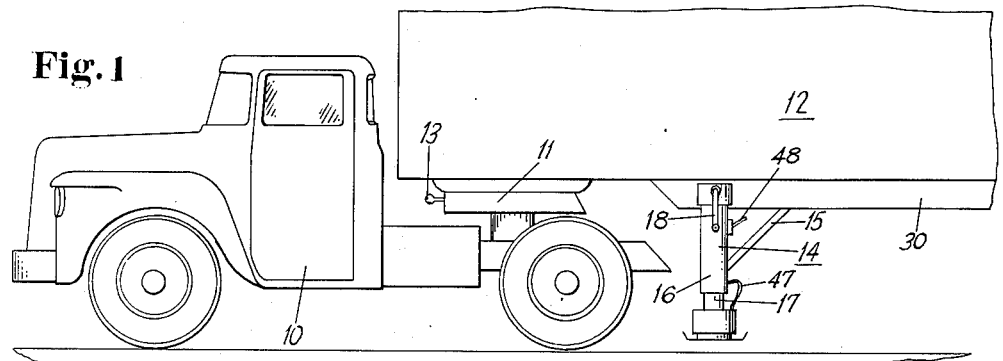

Briefly, in the practice of the invention, the ordinary foot of the landing gear is replaced by what will be referred to herein as a "powder box" unit. The phrase "powder box" has been used because basically the unit comprises telescoping cylindrical open-ended cups oppositely disposed and containing an expansible impervious bag so that by inflating the bag the so-called "powder box" can be extended.

Referring now more particularly to the drawing a tractor truck has been shown at 10, and this truck is provided with a fifth wheel 11. The trailer is indicated at 12 and it has a king pin (not shown) which engages with the fifth wheel 11 and which may be coupled to the fifth wheel by means of a coupling element operated by the handle 13. The structure heretofore described is entirely conventional and does not constitute a part of the present invention.

The semi-trailer 12 will have one or more axles at its rear end (not shown), which axles will carry wheels to support the rear end of the trailer. Thus in traveling position the rear end of the trailer is supported on its own wheels and the front end of the trailer is supported on the fifth wheel of the tractor.

It is often necessary to uncouple the tractor from the trailer perhaps simply to change tractors or perhaps to lift the trailer in position for loading or unloading while the tractor is used for another purpose.

In order to support the trailer when its front end is not supported on the fifth wheel of the tractor, the trailer is conventionally supplied with a landing gear indicated generally at 14. The landing gear is secured to the trailer frame and usually is supported by one or more diagonal struts 15. The landing gear may conventionally comprise an outer rigid member 16, which is rigidly secured to the trailer frame, and a telescoping member 17, which may be extended downwardly or retracted upwardly by turning the crank 18 manually. If the trailer is empty the member 17 can be extended to ground contacting position, and if the extending mechanism is a two-speed gearing, it is possible to elevate the front end of the trailer by turning the crank 18. The front end of the trailer must be elevated to withdraw the king pin to a position where it will clear the fifth wheel of the tractor so that the latter can drive away. Similarly in coupling the tractor to a trailer the front end of the trailer must be elevated to a point where the tractor fifth wheel can pass under the king pin, whereupon the member 17 may be withdrawn gradually until the king pin properly engages the fifth wheel and can be coupled thereto by means of the handle 13.

Figure 2:
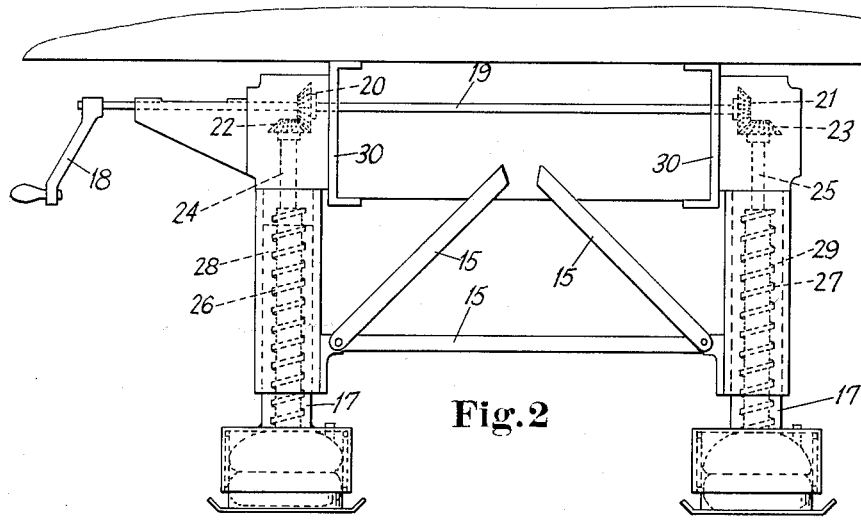
FIGURE 2 is a fragmentary elevational view of the landing gear as seen from the right of FIGURE 1.

FIGURE 2 shows this arrangement in somewhat more detail, where it will be seen that the handle or crank 18 is secured to a shaft 19 which carries the bevel gears 20 and 21. These engage respectively the bevel gears 22 and 23 which are secured respectively to the shafts 24 and 25. The shafts 24 and 25 are formed with the lead screws 26 and 27 which engage in nuts 28 and 29, which form a part of the extensible members 17. The landing gear structure is secured to the frame 30 of the trailer and is braced by suitable bracing indicated at 15.

The parts described above are conventional and do not constitute a part of the present invention.

Figures 3, 4:
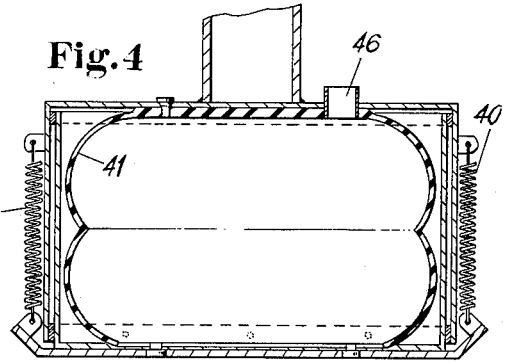
FIGURE 3 is a detailed cross-sectional view through one of the fluid lift devices in extended position.
FIGURE 4 is a view similar to FIGURE 3 showing the device in travelling position.

According to the present invention, secured to the lower ends of the members 17 are the "powder box" units which will now be described with particular reference to FIGURES 3 and 4. Each of the "powder box" units comprises an upper member 31 and a lower member 32. The upper member is secured to the member 17 as by welding at 33, or by other suitable means. The lower member 32 telescopes within the upper member as shown. Around its upper periphery the member 32 is provided with the retaining ring 34 which may be welded thereto, and the lower periphery of the member 31 is provided with a retaining ring 35 which may be made in two or more pieces and secured by machine screws or the like. From an examination of FIGURES 3 and 4, it will be seen that the rings 35 and 35 cooperate to prevent the lower member 32 from detelescoping out of the member 31.

The lower member 32 is provided with a ground engaging plate 36 which has the lateral extensions 37 and the ears 38 may be formed integrally with the portion 37, are welded thereto. The upper member 31 is provided with the ears 39 in alignment with the ears 38 and the tension springs 40 are secured at their two ends respectively to the ears 38 and 39. These springs are of such modulus that they normally retain the "powder box" unit shown in FIGURE 4, that is, with the "powder box" unit fully closed. But these springs may yield to the position shown in FIGURE 3 when the "powder box" unit is extended.

Secured within the "powder box" unit is an impervious expansible bag 41. Bags such as the bag 41 are available on the market, and are used for an air ride on tandem tractors, and are available from Firestone Tire and Rubber Co. The bags 41 have metal plates 42 and 43 bonded to them at the top and bottom respectively, an the bags are secured in place by screws or the like as indicated at 44 and 45. The bags are provided with fluid inlets an indicated at 46, and the fluid inlets are preferably connected by means of a hose 47 (FIG. 1) to the compressed air system of the tractor for the control of the "powder box" unit. A valve may be provided as at 48 (FIG. 1) in a location convenient to the operator, and this valve may be a conventional three-way fluid valve having a load, neutral, and relief position. Conventional copper tubing may be used for the fluid circuit except at the point where the air line must go from the fixed strut member 16 to the connection 46, and here it is necessary to use the flexible tubing 47.

It will be understood that this invention may be applied to existing landing gear by cutting the extendible member 17 off square, and welding to the member 31. Initial equipment may of course, be provided with the invention as shown. While dimensions are not critical, a device according to this invention has been constructed in which the "powder box" unit is about 15½ inches in diameter, and in which the extendability of the "powder box" unit is about 6 inches. It will, of course, be understood that because of the geometrical location of the landing gear, a given elevation at the landing gear produces a still greater elevation at the king pin, so that a "powder box" unit of the general dimensions described herein will be found sufficient for most purposes. Because of the large flat configuration of the member 32 in contact with the ground, many of the problems due to sinking in soft ground are eliminated because of the larger area involved.

It will be understood that numerous modifications may be made without departing from the spirit of the invention, and therefore no limitations are intended other than those set forth in the following claims.

What is claimed is:

1. A landing gear for semi-trailers comprising a supporting strut, a telescoping member mounted in said strut, and means for extending said telescoping member with respect to said strut between a traveling position and a supporting position, and fluid lift means secured to the lower end of said telescoping member, said fluid lift means comprising upper and lower elements interconnected for relative longitudinal movement between extended and retracted positions, and together constituting a "power box" unit, the upper of said elements being secured to said telescoping member, and retaining means associated with said elements to retain them in assembled relation, whereby when said telescoping member is extended downwardly to bring said lift means into contact with the ground, actuation of said fluid lift means will raise the trailer an amount sufficient to permit coupling said semi-trailer to, and uncoupling it from, a tractor.

2. A landing gear according to claim 1 wherein means are provided to yieldably hold said "power box" unit in fully retracted position.

3. A landing gear according to claim 1 wherein an impervious expansible bag is disposed within said "power box" unit, and means are provided to inflate said bag whereby to force said "power box" unit to fully extended position.

4. A fluid lift means for a semi-trailer landing gear having a strut and a telescoping member provided with means for extending the latter; said lift means comprising upper and lower elements interconnected for relative longitudinal movement between extended and retracted positions, and together constituting a "powder box" unit, the upper of said elements being secured to said telescoping member, and the latter of said elements being adapted to contact the ground upon extension of said telescoping member, and fluid means for producing extension of said "powder box" unit to raise said trailer a distance substantially equal to the height of said "powder box" unit.

5. A fluid lift means according to claim 4 wherein said upper and lower elements of said "powder box" unit are provided with retaining means to retain said elements in assembled relation.

6. A fluid lift means according to claim 4 wherein means are provided to yieldably hold said "powder box" in fully retracted position.

7. A fluid lift means according to claim 4, wherein an impervious expansible bag is disposed within said "powder box" unit, and means are provided to inflate said bag whereby to force said "powder box" unit to fully extended position.

References Cited by the Examiner
UNITED STATES PATENTS

| | | | |
|---|---|---|---|
| 1,928,368 | 9/33 | Coffey. | |
| 2,804,118 | 8/57 | Bayerkohler. | |
| 2,934,319 | 4/60 | Wahlstrom | 254—93 |
| 2,954,963 | 10/60 | Berg | 254—86 |

WILLIAM FELDMAN, *Primary Examiner.*

MILTON S. MEHR, *Examiner.*